United States Patent [19]
Johnson et al.

[11] Patent Number: 4,618,897
[45] Date of Patent: Oct. 21, 1986

[54] SYSTEM FOR SYNCHRONIZING PLURAL DATA STORAGE DEVICES TO A COMMON MASTER

[75] Inventors: Ronald R. Johnson, Shorewood; James A. Sieben, Mound, both of Minn.

[73] Assignee: IXI Laboratories, Inc., Shorewood, Minn.

[21] Appl. No.: 700,553

[22] Filed: Feb. 11, 1985

[51] Int. Cl.$^4$ .................... G11B 5/86; G11B 15/46
[52] U.S. Cl. .................................... 360/15; 360/73
[58] Field of Search ................................ 360/18, 73

[56] References Cited

U.S. PATENT DOCUMENTS

| | | | |
|---|---|---|---|
| 3,778,793 | 12/1973 | Hayashi et al. | 360/51 |
| 3,805,284 | 4/1974 | Coon, Jr. et al. | 360/15 |
| 3,864,735 | 2/1975 | Davis et al. | 360/51 |
| 3,938,184 | 11/1982 | DeFrancesco et al. | 375/110 |
| 4,157,573 | 1/1975 | Aghazadeh et al. | 360/51 |
| 4,357,707 | 2/1976 | Delury | 360/51 |
| 4,375,655 | 3/1983 | Korth et al. | 360/15 |
| 4,471,390 | 9/1984 | Hammann | 360/15 |

Primary Examiner—Vincent P. Canney
Attorney, Agent, or Firm—Orrin M. Haugen; Thomas J. Nikolai

[57] ABSTRACT

A system for facilitating the mass production of computer software on a magnetic storage medium. The system includes a master media transport system including means for reading data from a moving member, and a large plurality of slave media transport systems, including means for writing data on the media being transported by the plural slaves. A communications link couples the master to all of the slaves and the master provides a synchronizing signal to each of the plural slaves. Control means are provided in each of the slaves to cause the movement of the media at each of the slaves to be in precise synchronism with the movement of the medium at the master transport. Once synchronization is achieved, the data is read from the master medium and broadcasts to each of the slaves simultaneously for recording at predetermined desired locations on the media.

6 Claims, 17 Drawing Figures

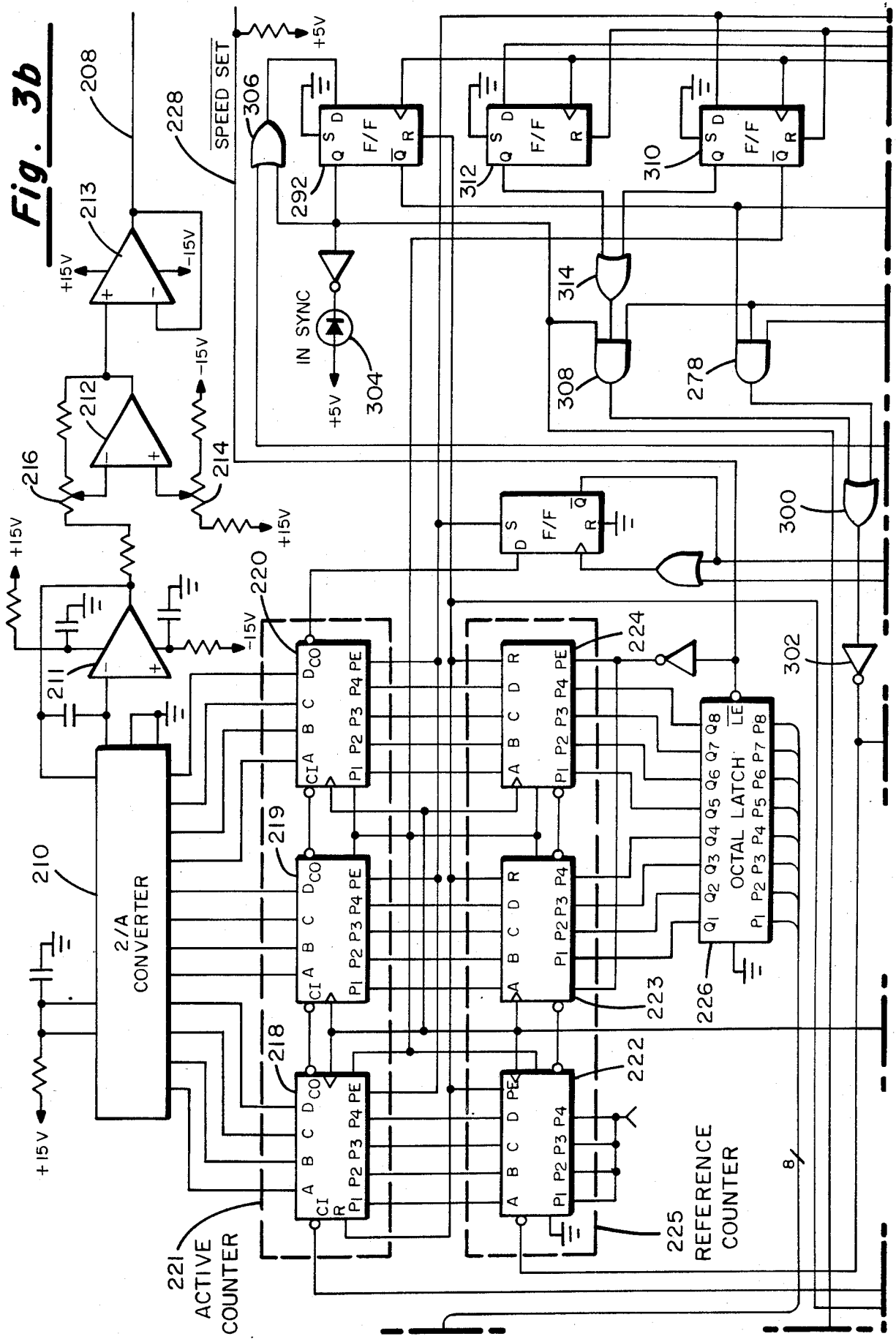

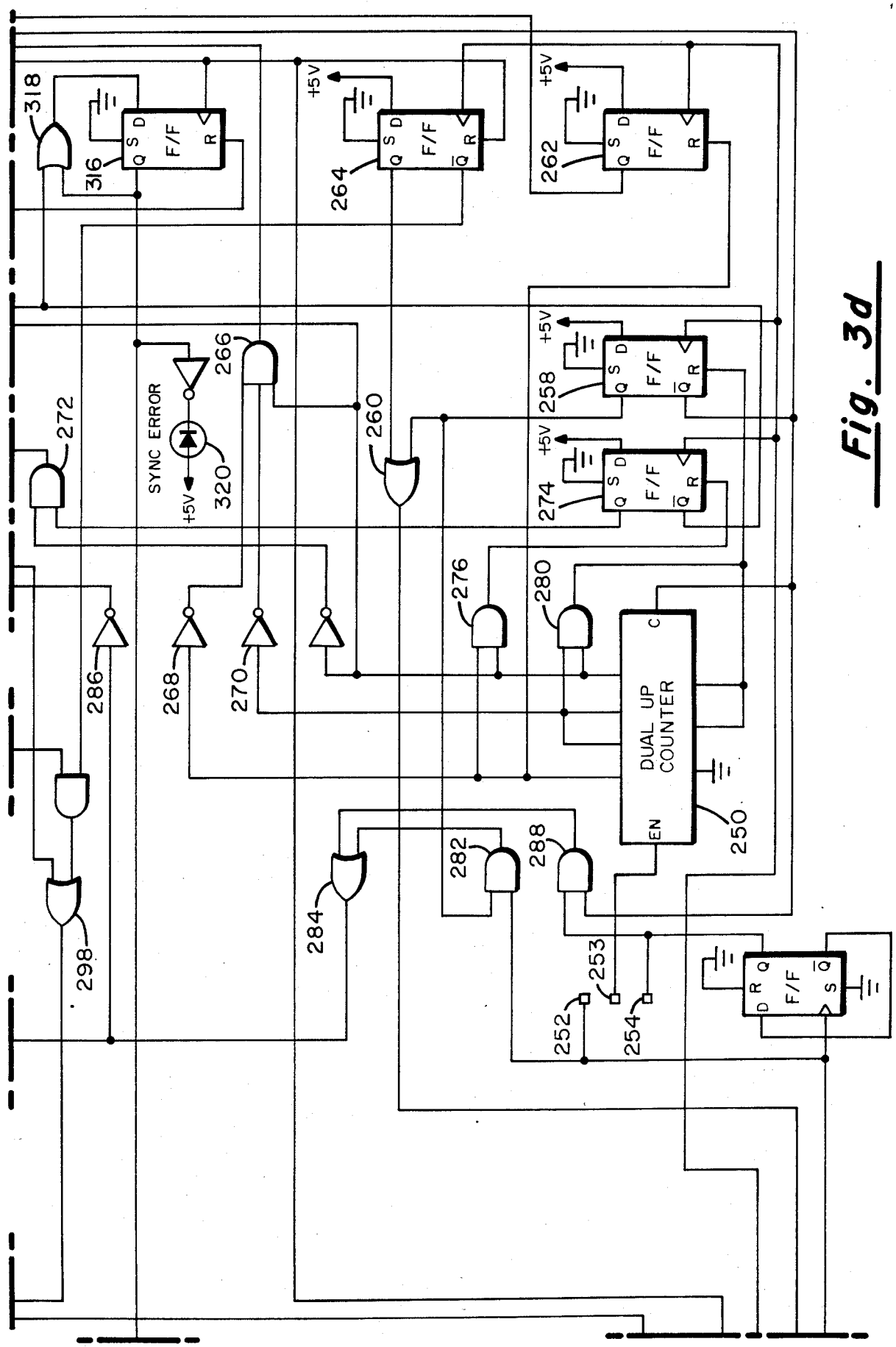

SYSTEM FOR SYNCHRONIZING PLURAL DATA STORAGE DEVICES TO A COMMON MASTER

BACKGROUND OF THE INVENTION

I. Field of the Invention:

This invention relates generally to digital data processing apparatus, and more specifically to a system for the mass replication of information (software) stored on a recording medium, e.g., magnetic disks.

II. Discussion of the Prior Art:

With the advent of the personal computer and the small business computer, there has been a significant growth in the marketing of packaged software products where floppy disks are used as the storage medium. This rapid growth has resulted in the need for equipment capable of high volume duplication of information-bearing floppy disks. While the personal computers and small business computers can be used to make copies of programs which are not copy-protected, it is necessarily done on a slow, one-at-a-time basis which is too inefficient for firms engaged in software publication. There is on the market a system referred to as the Formaster Disk Duplicator, which is a product of the Formaster Corporation of San Jose, Calif., which has been designed to facilitate the mass duplication of software on floppy disk media. That system incorporates a relatively large random access memory to store data from a diskette being copied. A plurality of floppy disk drives are coupled through associated controller modules to a control processor. Operating under software control, then, the diskette to be copied is first read and the information is stored in the system's RAM. Upon command, that data is transmitted through the systems's controllers to the disk drives, each of which incorporates a buffer memory for temporarily storing the data patterns to be recorded on the diskette. Each of the drives operates asynchronously relative to the other drives in the system. Each of the drives, however, has a means for generating an index or reference mark and, when that mark passes an appropriate sensor, the data contained within the drive's buffer is written on to the diskette. In that each of the drives must wait until its own index mark reaches a predetermined location before the actual write operation can take place, there can be a signifcant loss of time and, therefore, output capacity. Furthermore, the need to incorporate buffer memories in each of the drives for temporarily holding data to be recorded tends to be expensive.

In a co-pending patent application of Ronald R. Johnson, et al, Ser. No. 625,781, filed June 28, 1984, and entitled, FLEXIBLE DISKETTE COPY/FORMATTING SYSTEM, there is described an apparatus for copying and duplicating flexible magnetic storage diskettes, commonly referred to as floppy disks.

The present invention may be incorporated into the system described in the Johnson, et al application and provides a means whereby each of a large plurality of slave drives may be brought into rotational synchronization with a master index such that when this synchronization is achieved, the data to be replicated may be transmitted from the master to all of the slaves simultaneously and recorded on-the-fly whereby the need for large buffer memories for storing the recorded data until an internally generated index pulse is sensed can be eliminated.

In accordance with the invention, each of the plural slave units includes a motor for rotating a magentic storage disk at a speed determined by a suitable control circuit. The disk driven by the slave drive will typically have an index mark in the form of a hole or a recorded spot which acts to generate an index pulse once for each revolution of the disk. Otherwise, the drive's spindle may include an index pulse generator. In accordance with the present invention, an additional circuit is used to influence the motor control circuit of the drive itself. That is to say, each of the slave units includes a so-called "sync board" whose electronic circuits create an analog signal for adjusting an element on the motor control circuit associated with the drive.

In addition to its ability to transfer data and control signals over a communications link to the plural slave units, a crystal controlled oscillator in the master also generates and transmits a so-called "sync pulse" which comprises a reference or index. This "sync pulse" is also transmitted over the communications link to each of the slave units, and the "sync board" circuitry then develops the requisite analog signal for adjusting the speed of the drive motor so that the index pulse produced by each of the slaves is forced into synchronism with the sync pulse sent from the master. Located on the sync board is circuitry which functions to compare the time of occurrence of the master sync pulse relative to the occurrence of the Drive Index from the slave. In one form of the invention, it comprises a counter which is enabled by the occurrence of the Sync Index from the master and which then accumulates regularly occurring clock pulses until such time as the slave produces its Drive Index. The output from the counter circuit then represents a displacement error and this digital quantity is sent to a decode circuit which functions to generate timing pulses at a rate corresponding to the time difference between the occurrence of the Sync Index from the master and the disk index from the slave. Accordingly, the greater the angular displacement between the Master Index and the Slave Index, the greater the number of timing pulses. These timing pulses are accumulated in a counter whose output feed a digital-to-analog converter. It is the output of the D/A converter which, in turn, adjusts the speed of the slave's drive motor.

To detect when synchronization is achieved and when once achieved synchronization is later lost, a so-called "window's generator" is included on the sync board associated with each of the slave drives. So long as the Disk Index falls within a prescribed window, the slave is said to be in synchronism with the master. Loss of synchronization may be detected and that event reported back over the communications link to the master whereby, under software control, appropriate corrective action may be initiated.

In accordance with an alternative arrangement, rather than employing plural drives having DC motors therein, AC synchronous motors may be employed which, of course, operate at a speed directly related to the frequency of the power applied to the motors. In accordance with the alternative embodiment, then, the plural disk drive units driven by hysteresis synchronous motors are synchronized relative to a selected reference point derived from the AC supply voltage cycle. Once synchronization is achieved, the programming information and data contained on the master's diskette drive can be broadcast to all of the plural slave units and written on-the-fly, again obviating the need for expensive and time-consuming buffers.

OBJECTS

It is accordingly a principal object of the present invention to provide an improved method of establishing and maintaining synchronism between an electrically generated index in a Master Module with motor-driven devices in a plurality of slave modules.

Another object of the invention is to provide a method and apparatus for facilitating the replication of information stored on a magnetic disk by first establishing rotatioal synchronism between an electrically generated index signal originating in the master and the rotation of a plurality of slave disks such that when the synchronization is established, the information can be broadcasted to all slave disks for recording thereon.

Yet another object of the invention is to provide a system in which a Master Module broadcasts a synchronizing index pulse to a plurality of slave units, each of which is capable of generating its own internal Disk Index, each of the slave units including circuitry for forcing the Disk Index into time coincidence with the Sync Index.

A yet further object of the invention is to provide a motor control system in which plural AC synchronous motors may be made to rotate in a fashion that they remain synchronized with a reference relative to the AC line frequency powering them.

Other objects and advantages of the invention will become apparent to those skilled in the art from the teachings of the following specification, especially with reference to the accompanying drawings.

DESCRIPTION OF THE PREFERRED EMBODIMENT

In that the aforereferenced Johnson, et al application provides a complete description of a diskette replicating system in which the present invention finds use, the specification and drawings of that application are intended to be incorporated by reference herein.

Figure 1:
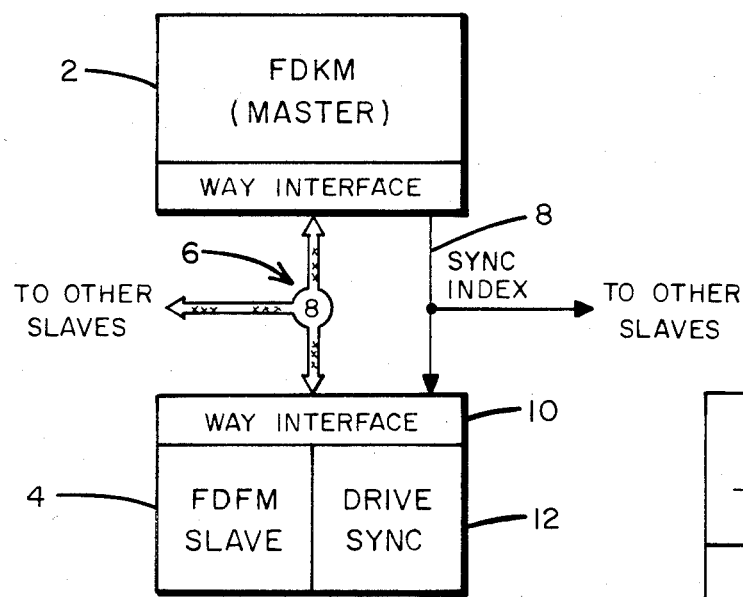
FIG. 1 is a general block diagram of a floppy disk copy/duplicator system in which the present invention finds use.
Figure 3:
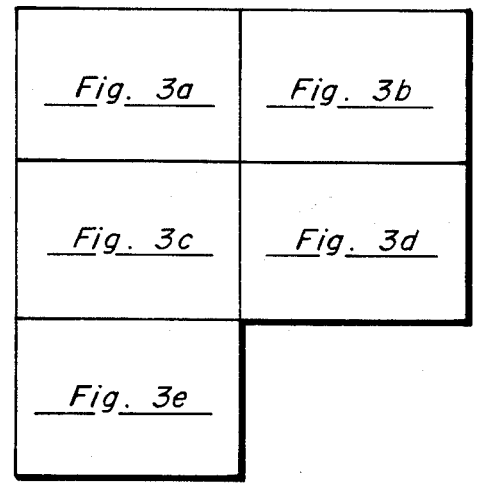
FIGS. 3(a)–3(e) when arranged as shown in FIG. 3 comprises a detailed logic diagram depicting the embodiment of FIG. 2.

With reference to the block diagram of FIG. 1, the system in which the present invention finds use includes a Master Module referred to as the FDKM which, as is more fully described in the aforereferenced Johnson, et al application, includes a hard disk and hard disk controller on which the information to be duplicated is stored. Not only is the programming data contained in the Master Module, but also the format information which, when recorded on a diskette, enables a computer to quickly locate the data which has been stored in accordane with the formatting information. The Master Module is able to communicate with a plurality of slave units, only one of which is shown at 4. Communication takes place over a daisy-chain bus 6 linking the Master Module to all of the slaves. One of the lines in the bus 6 is a control line originating at the FDKM and extending to all of the slaves. It is broken out from the bus 6 in FIG. 1 and identified by the numeral 8. As will be described in greater detail below, a control pulse, termed the "Sync Index", originates at the FDKM Master Module and it is this Sync Index with which the plural slave units ultimately become synchronized. This Sync Index pulse propagates through the Way interface 10 of the slave units and is utilized by the drive sync circuitry 12 in a fashion now to be described.

Figure 2:
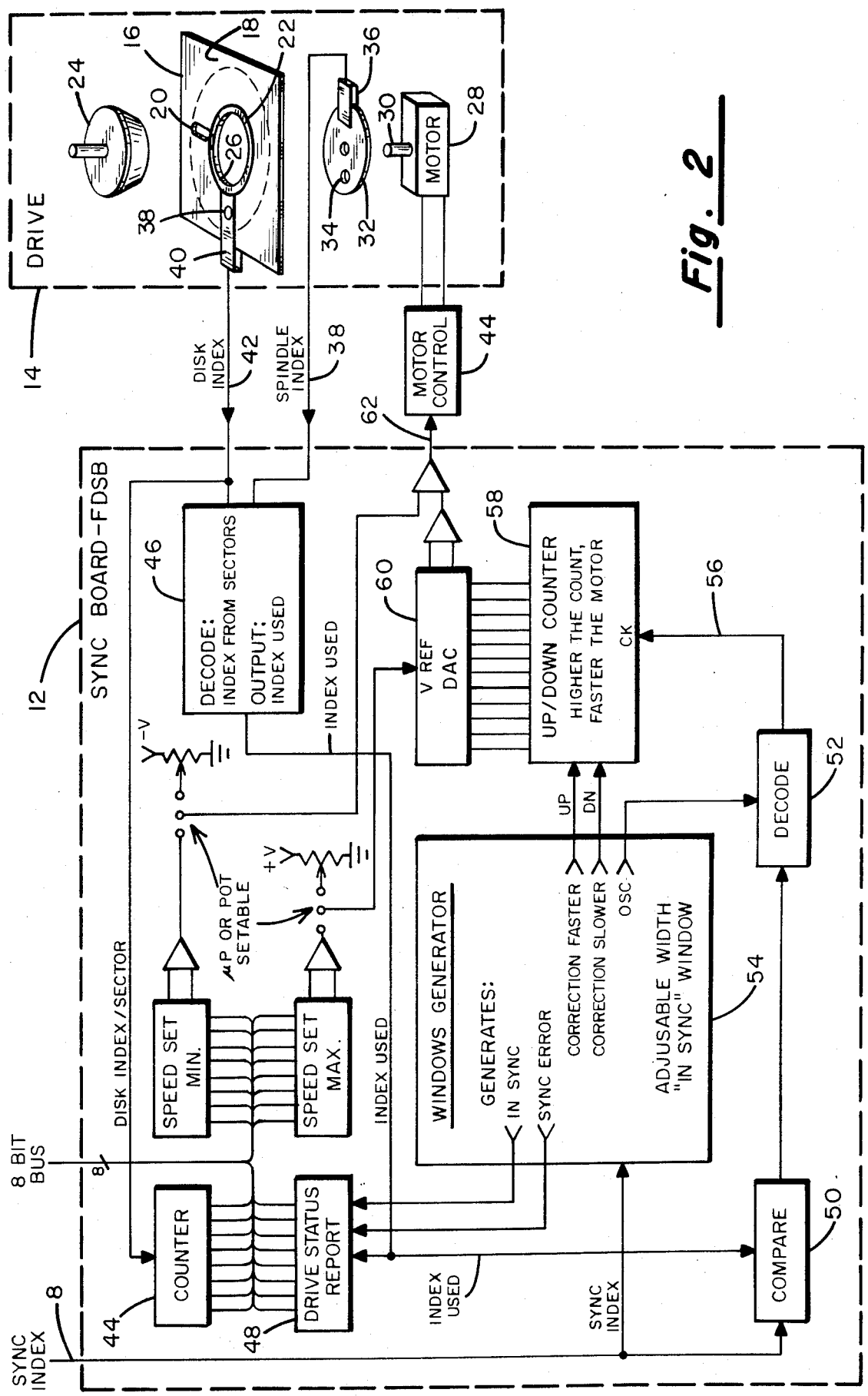
FIG. 2 is a general block diagram of one embodiment of the present invention.

With reference to FIG. 2, there is shown enclosed by a broken line box 14 a mechanical schematic diagram of the operative elements of a typical floppy disk drive mechanism. The floppy disk itself is identified by numeral 16 and includes an outer envelope 18 in which is contained a rotatable disk having a magnetic recording surface on each side thereof. A first elongated, radially-directed opening 20 in the envelope provides for access of a magnetic transducing head (not shown). A central opening 22 permits engagement between a driven tapered cone lock member 24 and the disk 26. Being tapered, the disk will tend to become centered relative to the axis of the cone. The cone lock is adapted to be driven by a suitable electric motor 28, and secured to the shaft 30 thereof is a disk 32 having an opening 34 therein. As the opening 34 moves past a Spindle Index detector 36, a Sprindle Index pulse is generated on the lines 38. In a similar fashion, the disk 26 has at least one reference mark thereon which may be in the form of a sensible hole passing through the record medium at a location which is radially aligned with a similar opening 38 formed in the jacket or envelope 18. Again, a suitable sensing device 40 is arranged to develop a pulse-type signal on line 42 as the reference mark on the disk passes a predetermined point.

Associated with the drive device 14 is a motor control circuit 44, which is arranged to vary the speed of the motor 28 in accordance with a control signal originating in the drive sync circuitry 12. As those skilled in the art will understand, various types of flexible recording disks are currently in use in the industry. There are so-called soft-sectored disks which have no index hole (such as hole 38 in FIG. 2) and there are hard-sectored disks which have not only an index hole, as at 38, but also a plurality of sector holes. It is the function of the counter circuit 44 to count the index/sector pulses on line 42 and, from that count, determine the nature of the diskette currently being driven by the drive. The information in counter 44 may be transmitted back over the Way 6 to the FDKM (Master) so that the master will be apprised of the number of holes in the diskette on which a copy is to be made.

Also coupled to the line 42 is a decode circuit 46 whose function is to separate the index pulse from sector pulses and indicate to a register 48 which of the pulses being received is the Disk Index pulse. This index pulse is also applied to a compare circuit 50. The compare circuit 50 also receives the Sync Index from the master via line 8. It is a function of the compare circuit 50 to compare the time of occurrence of the Sync Index with the time of occurrence of the Drive Index and to produce an output signal which is indicative of the temporal spacing therebetween. The output of the compare circuit goes to a decode circuit 52, which also receives regularly occurring clock pulses from an integrated circuit timer-oscillator comprising a part of the window generator circuit 54. The decoder 52 operates to control the number of clock pulses being emitted on line 56 as a function of the decoder input from the compare circuit 50. The greater the temporal separation between the Sync Index and the Drive Index, the greater the number of pulses issued by the decoder on the line 56.

The timing pulses on line 56 are, in turn, applied to the clock input of an up/down counter 58. The direction, up or down, which the counter will go is also determined by appropriate outputs from the windows generator 54 in a manner yet to be described. The count value contained in the counter 58 is applied as inputs to a multi-bit digital-to-analog converter 60. The count value is thus converted to a voltage signal on line 62 which is applied to the motor circuit 44. This signal then, in turn, will cause the motor to speed up or slow down until the Drive Index on line 42 occurs within a predetermined, exceedingly short time from the occurrence of the Sync Index.

It can be seen, then, that the circuitry on the sync board 12 is arranged to cause the speed of the slave drives to increase or decrease such that the Disk Index is in substantial time coincidence with the leading edge of the Sync Index pulse coming from the master. The window's generator 54 establishes a predetermined time period, typically 750 microseconds, which is divided into three parts. The first portion of the reference window is referred as the "Bump-Down" window while the third portion is referred to as the "Bump-Up" Window. The circuitry on the sync board functions to force the Disk Index to fall between these two windows. So long as the Disk Index falls within the reference window, it is deemed to be in synchronism with the Sync Index pulse with the master unit.

The windows generator 54 also functions to generate the "in sync" and "sync error" control signals which are transmitted, via the "drive status report" register 48 back to the master over the Way bus. The "in-sync" control signal is generated when the Disk Index is found to fall within the interval reference window. In turn, the "sync-error" signal is generated whenever synchronism has been established, but for one reason or another, a slave falls out of synchronism. This information is used by the master unit to adequately control other processing equipment such that any disk being written upon which is no longer in synchronism will be rejected and will not become part of the finished inventory.

Once synchronism is established and reported by the "drive status report" circuits in each of the plural slave units, the master may broadcast data representing signals to all of the slave units such that recording can be simultaneously performed, on-the-fly, with no need to use temporary holding registers whose contents are only written on to a disk when the disk rotates through a particular reference location. It will also be understood that because of the precise synchronism maintained, read verification operations can be readily performed simultaneously for all the slave units. During read verification, the master will again write the same information that had just been written onto the disk. Then, as the master is writing this information, the slave is made to read from the disk and does a comparison on-the-fly.

Now that the general principles of the invention have been described with the aid of a general block diagram, consideration will next be given to the details of the implementation of the sync board 12. With reference to FIGS. 3(a) to 3(e), there is shown by means of a logic block diagram a preferred implementation of the inventive system. As was previously described, the purpose of the synchronizing circuitry is to enable individual ones of plural slave modules to autonomously achieve synchronization such that an appropriate index reference point passes under the diskette write head coincident with a Sync Index pulse broadcast from the Master Module. Those skilled in the art recognize that there are various industry standards for Disk Index reference systems which must be accommodated to provide the necessary degree of versatality so that a diskette replicating system may be more universally used. Each of these standards requires a different approach to derive the Disk Index. Once the Disk Index has been derived, a control loop is formed which modulates the slave's disk drive motor speed to cause the Disk Index to be coincident with the Sync Index.

DERIVATION OF THE DISK INDEX

The derivation of the Disk Index to be synchronized (also referred to herein as the Derived Index) is controlled by a sequencer which steps the circuitry through the following phases:

1. First, a determination is made as to the type of disk present in the drive. That is, a determination is made whether the disk in question is soft sectored with no index hole, soft sectored with an index hole or hard sectored with a combination of index and sector holes.

2. In the case of a hard sectored disk, program the sector/index counter to the number of total holes in the diskette.

3. In the case of a hard sectored disk, separate the index hole from the other sector holes.

4. Generate the derived index signal.

Shown enclosed by the dash line box 100 is a shift register sequencer which is used to establish the time phases in the derivation of the Disk Index. It is comprised of a plurality of interconnected flip-flops 101–106 and the sequence is initiated when the $\overline{\text{Door Closed}}$ signal on line 108 (FIG. 3(a)) goes low, indicating that the door on the diskette drive is closed. Alternatively, the master unit may generate a signal causing the $\overline{\text{RE START}}$ on line 110 to go low, which will re-initiate the sequence, providing the door is also closed. Either event triggers a one-shot circuit 112 and thus propagates a START pulse through AND gate 114 to set the flip-flop 116 comprised of NAND gates 118 and 120 and thus present a "1" at the D-input to the first stage flip-flop 101 of the sequencer 100. The next Spindle Index on line 122 clocks flip-flop 101 to the Set condition via AND gate 124. This action resets the flip-flop 116, via inverter 126, presenting a "1" to the D-input of flip-flop 101. On the next Spindle Index pulse, flip-flop 101 resets while flip-flop 102 sets. Each subsequent Spindle Index pulse, unless otherwise inhibited, causes a "1" to be propagated to the next flip-flop of the sequencer 100. In this manner, each revolution of the spindle accounts for a specific time phase in the index derivation sequence.

Figure 3A:
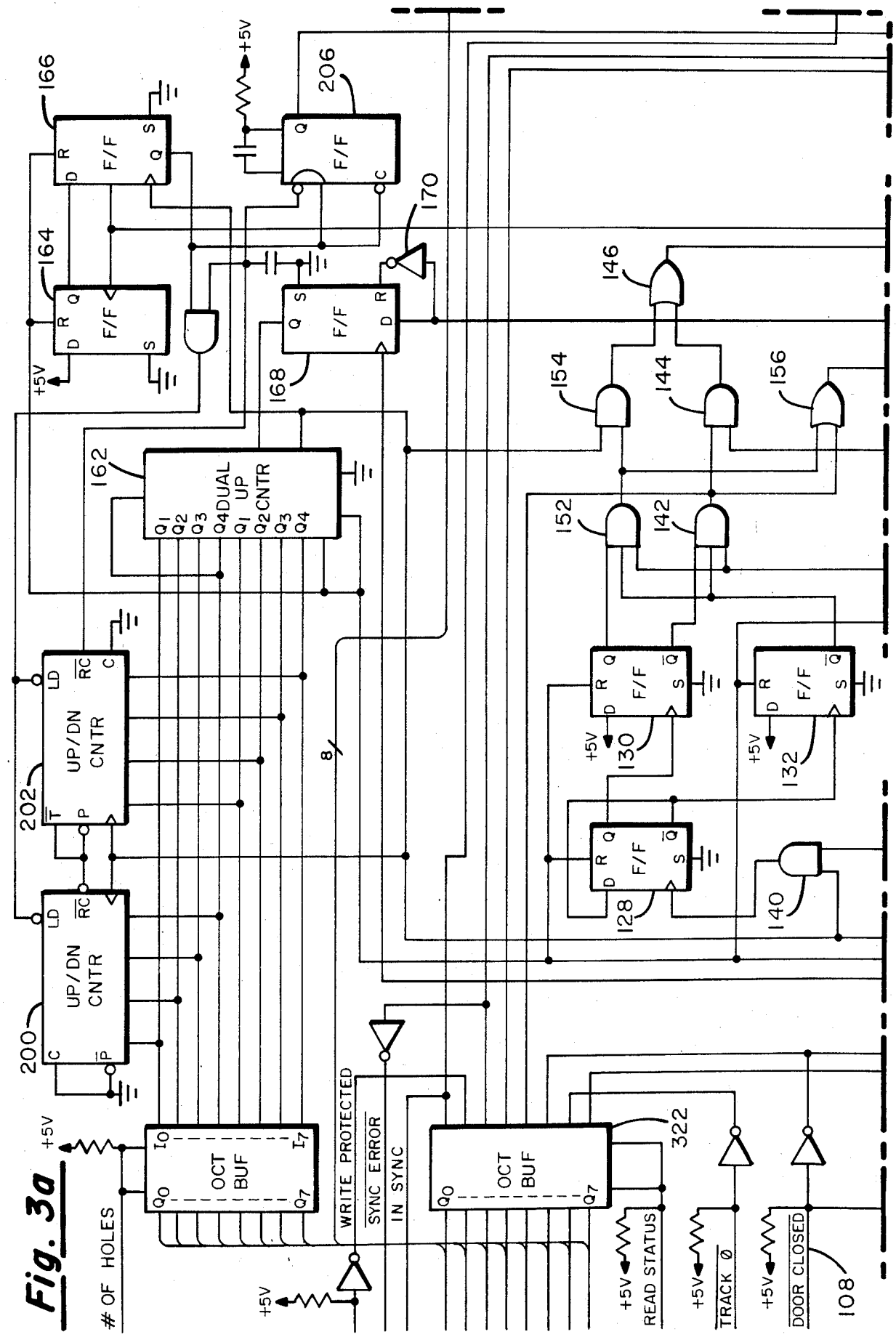
Figure 3C:
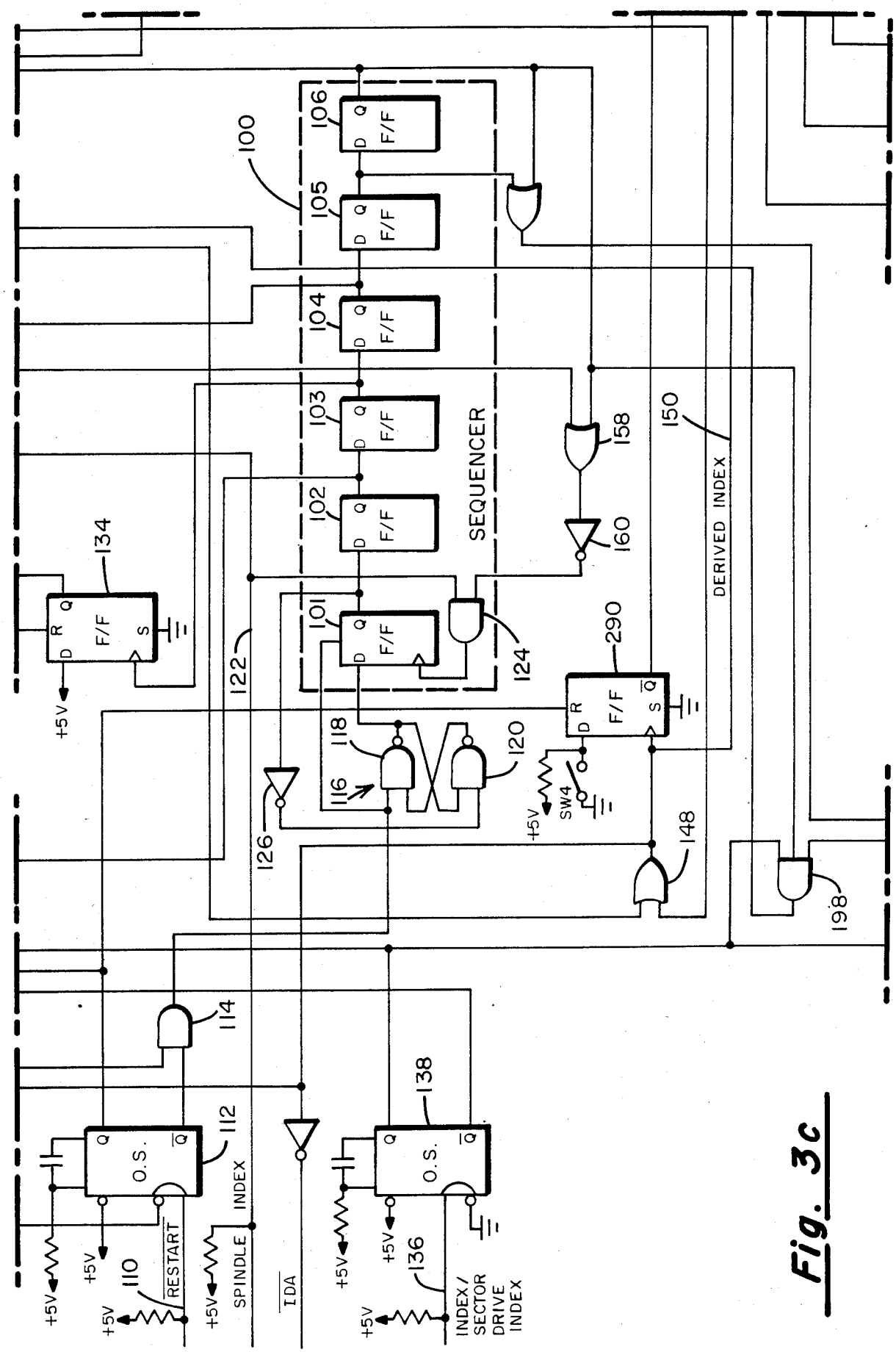

With reference to FIG. 3(a), the flip-flops 128, 130, 132 and 134 cooperate to determine the kind of diskette, i.e., the number of holes which are present. At the beginning of the sequence, the flip-flops 128-134 are all reset by the output from one-shot 112. The Disk Index/Sector line 136 triggers one-shot 138 each time a hole in the diskette is sensed. When flip-flop 102 of the sequencer 100 has been set, the pulses from oneshot circuit 138 are allowed to propagate through AND gate 140. If a first hole is sensed, flip-flop 128 is clocked to the Set condition, causing flip-flop 130 to also be clocked to the Set condition by the Q-output of the flip-flop 128. If a second hole is sensed, flip-flop 128 is clocked again and is reset due to the feedback from the Q output to the D-input causing flip-flop 132 to be clocked to the Set condition. While flip-flop 128 will continue to toggle if subsequent holes are sensed, there is no further effect on flip-flops 130 or 132, the state of which is now indicative of the number of holes sensed in one revolution of the spindle and, therefore, the type of diskette present.

On the next Spindle Index pulse on line 122, flip-flop 103 sets to clock flip-flop 134 to the Set condition. If both flip-flops 130 and 132 are reset, indicating that there is no index hole in the diskette, AND gate 142 is now enabled which allows pulses on the Spindle Index line 122 to propagate through AND gate 144 and OR gate 146 to OR gate 148, such that the Spindle Index pulse on line 122 becomes a Derived Index pulse on line 150. This assures that, although the beginning of the track is referenced to an arbitrary position relative to the diskette media, they are aligned relative to each other by virtue of the Spindle Index reference, as required for this class of diskettes.

If flip-flop 130 is set while flip-flop 132 is reset, indicating a single index hole in the diskette, AND gate 152 will be enabled, which allows pulses from the one-shot 138 to propagate through AND gate 154, OR gate 146 and OR gate 148 such that the Derived Index on line 150 is developed from the diskette index hole. This permits the beginning of the track to be referenced to an absolute position on the diskette, i.e., the diskette index hole. If either, but not both, of flip-flops 130 and 132 are Set, the sequencer clock is inhibited via OR gate 156, OR gate 158, inverter 160 and AND gate 124, since the process of deriving the index is now complete.

If both flip-flops 130 and 132 are set, indicating a hard sectored disk, the derivation of the index is more complicated. In this event, both AND gates 152 and 142 are disabled, inhibiting any signals from propagating through OR gate 146. In the case of a hard sectored diskette, the pulses from one-shot 138 indicate both sector and index holes. Sector holes are equally spaced, with a single index hole interspersed between two adjacent sector holes. In this instance, it is necessary to first determine the total number of holes and then find the pulse which corresponds to the index and count to separate the index pulse from the extraneous sector pulses. This is a simple matter if the total number of holes and, therefore, the time interval between the holes is known. However, a novel feature of the present invention is that it is capable of locating the index hole independent of the total number of sector holes and thus accommodate any hard sectored format. This hole count is captured in the dual up-counter 162 (FIG. 3(a)), which in the preferred embodiment may comprise a Type 4520 Integrated Circuit manufactured by RCA. Such a circuit is comprised of two 4-bit counter sections, the A and B sections, which, in this case, are cascaded to form a single 8-bit counter. At the beginning of the sequence, the counter 162 and associated flip-flops 164 and 166 are reset by the pulse from one-shot 112. Flip-flop 168 is held reset by the output from inverter 170. In the next phase of the sequence, flip-flop 104 of the sequencer 100 sets for one revolution of the spindle. During this time, a "1" is presented to the D-input of flip-flop 168 while the reset is released by way of inverter 170. On the trailing edge of the next pulse out of one-shot 138, the Q output goes positive, clocking flip-flop 168 to the Set condition and enabling the counting to proceed to dual up-counter 162 by presenting a "1" to the CK A input which, in this instance, is employed as an active high clock enable. Each subsequent pulse from one-shot 138 causes the counter 162 to increment via the EN A input which, in this instance, is employed as a clock signal. Holes in the diskette are thus counted, such that at the end of this phase, the count in counter 162 represents the total number of sector holes in the diskette.

Figure 3E:
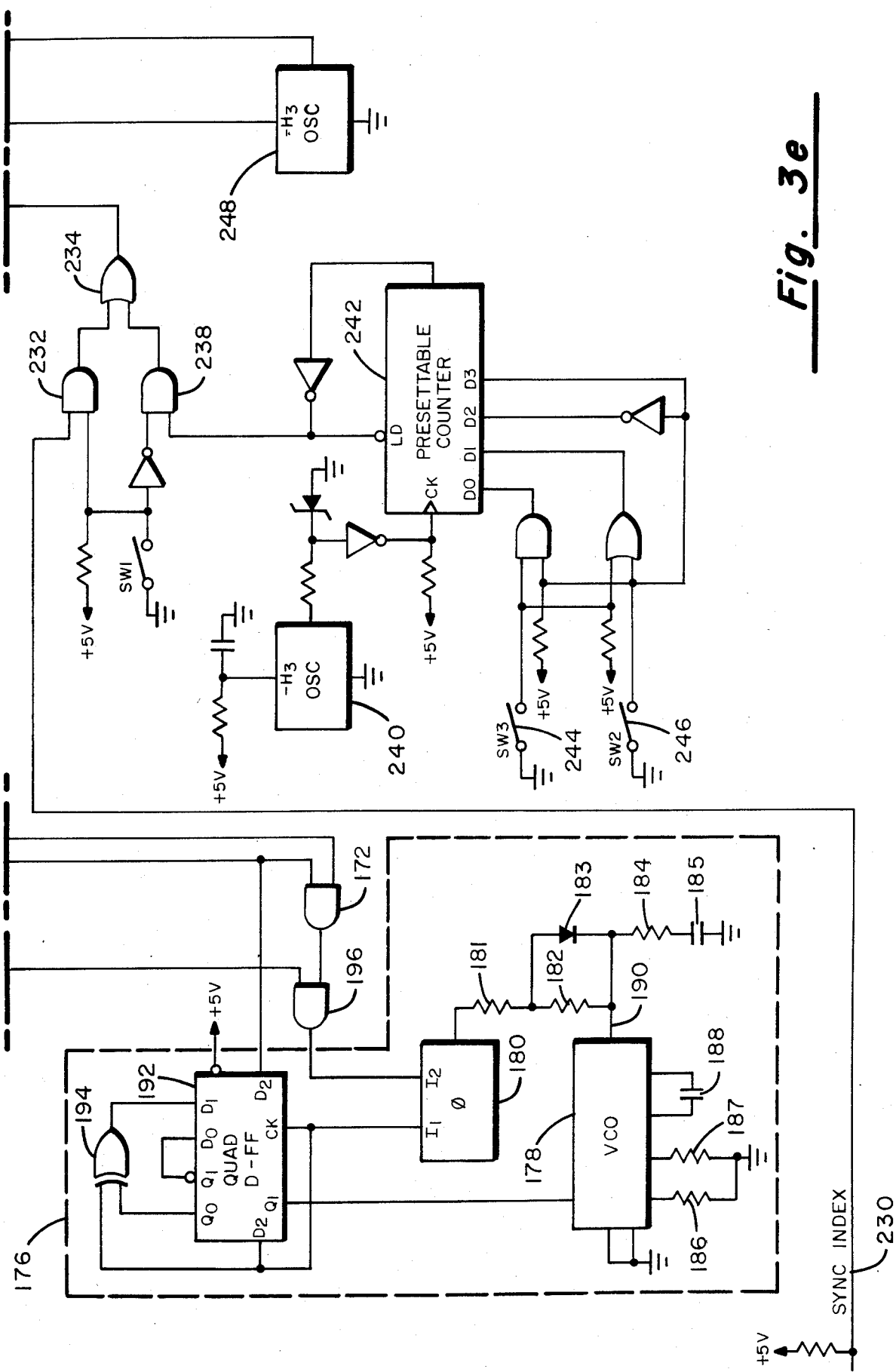

On the next phase of the sequencer 100, flip-flop 105 thereof sets to partially enable NAND gate 172 (FIG. 3(e)) via OR gate 174 to thus enable the phase lock loop (PLL) which is shown as being enclosed by the broken line box 176.

The PLL 176 is used to distinguish index holes from sector holes. More specifically, it is seen to comprise a conventional circuit consisting of a voltage controlled oscillator 178, a phase comparator 180, and a loop filter comprised of passive components 181-185. The resistors 186 and 187, along with capacitor 188, establish a nominal frequency which depends upon the type of disk presently in the drive for the VCO. The loop functions to maintain a precise quadrature phase relationship between inputs $I_1$ and $I_2$ of the phase comparator 180 by modulating the VCO via its control input on line 190.

The quad-D flip-flop 192 is configured to form a special purpose counter by means of the feedback from $Q_1$ to $D_0$ and also the feedback from $Q_0$ or $D_2$, via Exclusive OR gate 194, to $D_1$. It will be observed that the effect of these connections is to cause the counter to count in a special sequence, i.e., 001, 010, 111, 100, 001, 010, . . . . From an inspection of this count sequence, it can be seen that the output $O_1$ is the voltage control oscillator frequency divided by two, which forms the reference input $I_1$ of the phase comparator 180, while output $Q_2$ is identical to output $Q_1$ except it is delayed 90° in phase.

The output $Q_2$ from the quad-D flip-flop 192 propagates through NAND gate 172 and is logically ANDed with pulses from one-shot 138 by AND gate 196 to form the input $I_2$ to phase comparator 180. Since the phase lock loop 176 maintains a precise quadrature relationship between inputs $I_1$ and $I_2$, and the leading edge of the output $Q_2$ of the quad-D flip-flop 192 is coincident with the index pulse from the one-shot circuit 138. The PLL syncs up with the sector holes. When the PLL is phase locked to the sector holes, the index pulse can be separated in a simple "ANDing" operation.

In the last phase of the sequencer 100, it is flip-flop 106 which sets, causing AND gate 124 to be disabled via inverter 160 and OR gate 158, thus preventing any further change to the sequencer status. With flip-flop 106 set, AND gate 198 is enabled at the leading edge of the next Disk Index pulse causing flip-flop 164 (FIG. 3(a)) to be clocked to the Set condition. The next pulse from one-shot circuit 138 clocks flipflop 166 to the Set condition, since its D-input is now a "1". Prior to this event, the 8-bit counter comprised of up/down counters 200 and 202 has been held at a Load Enable condition by virtue of the low signal presented to the Load inputs via AND gate 204.

The present inputs of counter 200 and 202 are the outputs of counter 162, i.e., a count equal to the number of sector holes in the diskette. With the Load inputs of counters 200 and 202 high, each pulse from one-shot 138 decrements the count contained in counters 200 and 202. When the count is decremented to "0", indicating that the disk has revolved back to the index hole again, the RC pin of counter 202 goes low to trigger one-shot circuit 206 and again load counters 200 and 202 via AND gate 204 to establish the initial count equal to the number of sector holes. Through this counting process, one-shot 206 is triggered each time the index hole is sensed, and this signal propagates through OR gate 148 to establish the Disk Index on line 150 for a hard sectored diskette. By using this counter approach in the synchronization process, loss of sync by the PLL occasioned by motor speed variations is obviated.

THE SYNCHRONIZATION PROCESS

The synchronization circuitry senses the time of the Derived (Disk) Index relative to the Sync Index from the master and makes vernier adjustments to the speed of the diskette drive motor via a digital-to-analog converter to maintain precise synchronism between these two signals. The leading edge of the Sync Index defines a time window of approximately 750 microseconds, where the window is further divided into 24 equally spaced segments which, for convenience, will be referred to as window segments 0-23. The system is considered to be in synchronization if the Derived Index occurs in window segments 0-15. To achieve synchronization, the circuitry operates first in the so-called "slew" mode to cause the Derived Index signal to be brought rapidly into the window, i.e., sychronization. Once synchronization is achieved, the circuitry goes to a tracking mode in which vernier speed adjustments are made to maintain synchronization.

To accomplish the vernier tracking operation, three other regions of the window are defined. Window segments 0-3 define the Bump-Down Sense Window. Window segments 16-19 define the Bump-Up Sense Window, and window segments 20-23 define the Bump Window. It is during the Bump Window that a vernier adjustment of the reference speed count is made, conditional upon sensing the Derived Index in either the Bump-Up Sense Window or the Bump-Down Sense Window.

The disk motor speed is controlled by an electrical signal on line 208, which is combined in the motor speed control circuitry to provide a vernier range of speed control. This signal is derived from a digital-to-analog converter 210 passing through operational amplifiers 211-213. These operational amplifiers provide the appropriate buffering and scaling such that the digital range of the digital-to-analog converter 210 spans the range of vernier speed control required for synchronization. Specifically, potentiometer 214 establishes a reference speed for a specific value in the digital-to-analog converter, while potentiometer 216 establishes a speed sensitvity, i.e., an incremental change of speed for each count of the digital-to-analog converter. The 4-bit presettable up/down counters 218-220 are cascaded to form a single 12-bit up/down counter, designated the Active Counter, and which is shown as being included in a dash line box 221. The Active Counter directly controls the digital-to-analog converter 210. The average speed of the drive motor is thus proportional to the average value contained within counter 221. Similarly, counter stages 222-224 combine to form the 12-bit Reference Counter which is shown as being enclosed by the broken line box 225. This counter is preset from the Flexible Diskette Kopy Module (FDKM) via an octal latch 226 with a digital value representative of the nominal disk speed slightly less than the frequency of the Sync Index. When the $\overline{\text{Speed Set}}$ 228 goes low, the data from the WAY data bus is latched into the device 226 while at the time, the "preset enable" of counter 225 is activated, causing the 8-bit value to be loaded into the eight most significant bits while the four least significant bits are forced to their binary "0" level. This count is used at the beginning of the slew process.

In normal operation, the Sync Index signal coming in on line 230 (FIG. 3(e)) propagates through AND gate 232 and OR circuit 234 to provide the synchronization reference signal. Alternatively, for test purposes, a switch 236 may be closed to disable AND gate 232 and to enable AND gate 238 to generate test sync signals for off-line test purposes. These test signals are derived from the 60 Hz oscillator 240 which clocks presettable counter 242, causing it to function as a programmable frequency divider. Each time this counter overflows, a "test sync index" signal is generated, while at the same time, the counter is preset to a value determined by the setting of the switches 244 and 236. This arrangement allows test signals of 5, 6, 10 and 12 Hz to be generated. Thus, for either the on-line and test conditions, the output from OR gate 234 represents the reference timing signal to which the diskette is to be synchronized.

A 26.7 KHz oscillator 248 provides pulses which clock counters 224 and 221 and also determines the window segment time. The window segments are determined by the value of the count in the dual up-counter 250, which comprises a Type 4520 Integrated Circuit and is cascaded to form a single 5-bit counter.

Where this arrangement might result in instability and loss of synchronization for a lower performance drive, a jumper can be placed between pads 253 and 254. Flip-flop 256 is arranged to toggle on each clock pulse from oscillator 248, thus, the window segment time is doubled and counters 225 and 221, when enabled, count twice for each window segment.

WINDOWS GENERATION

The generation of the various windows defined by counter 250 will now be described. Initially, flip-flop 258 is reset, presenting a high signal on the $\overline{\text{CK}}$ A input of counter 250. In this instance, this input functions as an active low clock enable signal. Thus, the pulses into the EN A input which, in this instance, functions as an active high clock, are disabled and the counter 250 is held in a Reset condition. The leading edge of the Sync Index pulse causes flip-flop 258 to the Set condition to initiate the beginning of the window. This action releases the Reset of oscillator 248, via OR circuit 260, to permit clock pulses to increment the counter 250.

The leading edge of the Sync Index signal also clocks flip-flop 262 to the Set condition to begin the Bump-Down Sense Window. When output $Q_{3A}$ of the counter 250 goes high, indicating the end of the third window segment, flip-flop 262 is reset to terminate the Bump-Down Sense Window. The leading edge of the Sync Index also clocks flip-flop 264 to the Set condition to define the beginning of the slew period. It remains set until the next Derived Index pulse is developed on line 150. NAND gate 266 is connected to the counter 250 by way of inverters 268 and 270, such that its output is high only during window segments 16–19, i.e., the Bump-Up Sense Window. AND gate 272 is connected to counter 250 and flip-flop 274 such that its output is high only during window segments 0–15, i.e., the In-Sync Window. When counter 250 reaches a decimal value of 20 (binary 10100), AND gate 276 is enabled to reset flip-flop 274. This event partially enables AND gate 278 and defines the beginning of the Bump Window. When counter 250 reaches a decimal count of 24 (binary 11000), AND gate 280 is enabled which causes the flip-flop 254 and the counter 250 to be reset, thus terminating the synchronization window.

During the synchronization window, when flip-flop 258 is set, AND gate 282 is enabled, allowing pulses from the oscillator 248 to directly clock the Reference Counter 225 and the Active Counter 221 through OR gate 284 and inverter 286. During the slew mode in periods which are outside of the synchronization window, i.e., flip-flop 258 is reset. To prevent over-shoot of the synchronization window, it is necessary to reduce the rate of change of Active Counter 221. Thus, in this case, AND gate 282 is disabled and the pulses from oscillator 248 are divided by two by toggle flip-flop 256 and propagate through AND gate 288 and OR gate 284 to clock the Active Counter 221 and the Reference Counter 225.

A detailed description of the synchronization process will now be provided. The synchronization process is initiated when flip-flop 290 (FIG. 3(c) sets, thus releasing the reset on Counters 225 and 221 and flip-flop 292. Reference Counter 225 is preset to its initial reference count. During the Bump-Down Sense Window when flip-flop 262 (FIG. 3(d)) is set, the reference count is transferred to the Active Counter 221. With flip-flop 264 set and flip-flop 296 reset, the output of OR gate 298 is low to enable counting in Active Counter 221. Count direction is controlled by flip-flop 262. The count direction is down only if the Derived Index occurs during the Bump-Down Sense Window indicating the motor speed is at the fast limit. During the Bump-Down Sense Window, the Active Counter 221 merely tracks the state of the Reference Counter 225 because of the preset enable condition. In the slew mode, Counter 221 is held fixed during this period. At the end of the Bump-Down Sense Window, the preset enable of Counter 221 is released and that counter begins advancing, thus increasing the drive speed until the Derived Index on line 150 resets flip-flop 264. The effect of this is to make the average speed of the drive proportional to the time between the Sync Index and the Derived Index. If the Active Counter 221 overflows, flip-flop 296 becomes set to thereby disable negative AND gate 298 and thus frees the counter at the maximum speed value. If the Reference Counter 225 were maintained at its initial count, the system would reach an equilibrium in which the drive would be synchronized to the frequency of the Sync Index, but delayed in time by an amount proportional to the difference between the initial reference count and the count corresponding to the equilibrium speed of the drive. The drive is brought into phase synchronization by adjusting the value of the Reference Counter 221. With flip-flop 292 reset, AND gate 278 is enabled during the Bump-Up Window to cause counting of the Reference Counter 225 to be enabled via OR gate 300 and inverter 302, causing the Reference Counter 225 to be incremented by four counts for each Sync Index pulse (eights counts if jumper pad 253 is connected to jumper pad 254). Since the ramp-up of Active Counter 221 starts four counts higher each revolution, the average speed is increased and the delay between the Derived Index and the Sync Index decreases until the Derived Index occurs in the in-sync window segments 0–15. Now, flip-flop 292 is clocked at a time when the D-input is high and thus it sets to indicate an in-sync condition, lighting the LED indicator 304. Feedback through OR gate 306 assures that this flip-flop will remain latched even if synchronization is subsequently lost. Setting of the flip-flop 292 terminates the slew mode by disabling AND gate 278 and initiates the tracking mode by partially enabling the AND gate 308.

Now, the Reference Counter 225 is held fixed so long as the Derived Index on line 150 does not drift into either the Bump-Up or Bump-Down Windows. Starting at window segment 4, counter 221 advances until the arrival of the Derived Index to provide a vernier proportional control of speed. In an ideal system, this control would itself be sufficient to maintain synchronization. However, anamolies in a real system can cause the index to drift out of the vernier window.

If the Derived Index drifts to occur during the Bump-Down Sense Window indicating the drive is running too fast, the Bump-Down flip-flop 310 sets. If the Derived Index drifts to occur in the Bump-Up Sense Window defined by the output from AND gate 266, indicating that the drive is running too slow, the Bump-Up flip-flop 312 sets. Either of these events will cause the output of OR gate 314 to go high, such that when the flip-flop 274 resets at the beginning of the window segment 20, AND gate 278 is enabled, thus permitting four (or eight) counts to be fed into the Reference Counter 225, with the count direction determined by the state of flip-flop 310. Since this Bump operation can occur each revolution of the disk, the counters will adapt to maintain synchronization over a wide range of anomalous events.

Flip-flop 292 holds flip-flop 316 reset until synchronization is sensed. Once in sync, if the Derived Index occurs outside of the in-sync period, i.e., window segments 0–19, the flip-flop 316 will be set and maintained in that Set condition via feedback through OR gate 318, even though synchronization is re-established. Thus, any transient synchronization error is trapped, causing LED 320 to be lit to indicate the synchronization error and also providing notification of the error back to the FDKM or Master via the octal buffer 322 (FIG. 3(a)).

ALTERNATE EMBODIMENT

Figure 4:
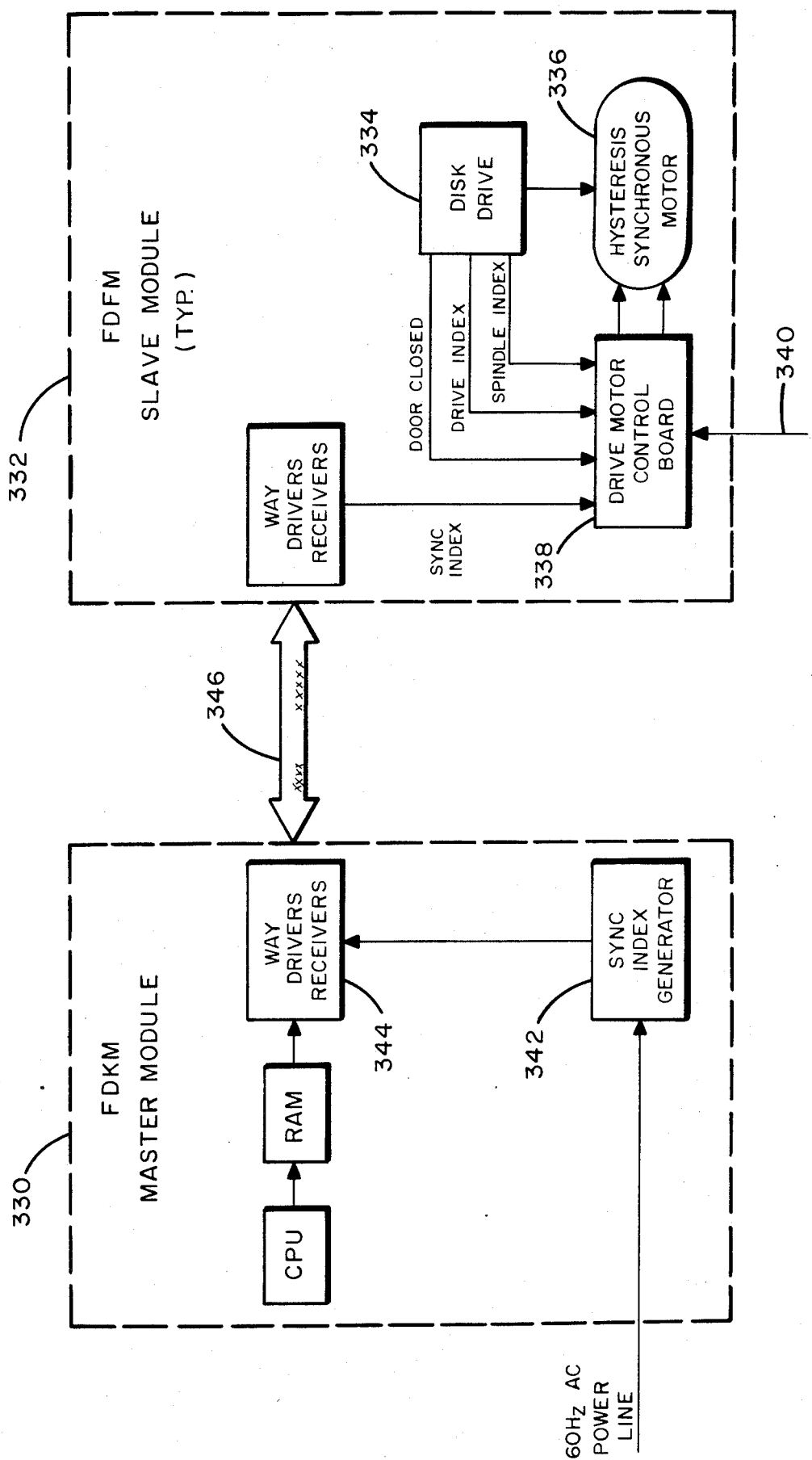
FIG. 4 is a general block diagram of an alternative embodiment.

In the previously described embodiment, it was assumed that the drive motors and each of the slave units is a multi-winding DC motor, a type of motor which is commonly used in floppy disk handlers. In this alternative arrangement, each of the drives incorporates a synchronous motor which, of course, runs at a speed which is directly related to the frequency of the applied AC power. In synchronizing such slave drives to a Sync Index pulse from a master, the AC motors are controlled such that the Disk Index or Spindle Index of the slave is precisely positioned relative to a periodic point derived from the AC supply voltage. Once synchronization is achieved, the formatting and data information to be reproduced may be broadcast from the FDKM to all of the slaves over the D-Way bus and stored, on-thefly, on each of the slave diskettes. Referring to FIG. 4, the master or FDKM module is identified by numeral 330, while numeral 332 refers to a typical one of a plurality of slave or FDFM modules.

The FDFM can be seen to include a diskette drive 334 which includes a hysteresis-type synchronous motor 336 having non-salient poles for operating the drive mechanism. A control board 38 is operatively coupled to the motor 336 and to the disk drive 334, and it also is arranged to receive the Sync Index control signal originating at the FDKM 330.

As those familiar with AC motors are aware, a hysteresis-type synchronous motor, such as motor 336 in FIG. 4, does not have a preferred synchronous position and is able to lock up in any position relative to the AC line frequency. As such, it is well suited for the instant application in that such motors allow very fine adjustment of the shaft rotation thereof relative to any selected reference point of an AC line voltage. The motor 336 is driven through a 60 Hz AC power line 340 and will rotate at a constant speed of 1800 RPM, assuming it is a four pole motor. The disk drive 334 includes conventional gearing for speed reduction purposes whereby the diskette is made to rotate at a desired speed, e.g., 300 RPM or 360 RPM.

Referring to the FDKM 330, it is seen to include a Sync Index generator 342 which is operatively coupled to the Way interface 344 so that a Sync Index control signal can be transmitted to each of the slaves via the Way bus 346.

In addition to receiving the Sync Index originating at the FDKM, the FDFM drive motor control board 338 of each slave also receives control signals from the disk drive 334. With continued reference to FIG. 4, it can be seen that a first of such control signals is referred to as the "door closed" signal. It is a characteristic of floppy disk drives that the door be closed before the diskette is brought into engagement with the motor-driven spindle supporting the diskette.

The system of this alternative arrangement is also capable of handling soft sectored disks having a single index hole, hard sectored disks having not only a single index hole but a plurality of sector holes as well or a special soft sectored disk having no index hole. An Opto-sensor or other suitable means (not shown) are provided for sensing the spinning of a disk or the drive spindle and deriving an index pulse denoting the period and phase angle of the disk or spindle irrespective of the type of disk involved. Either the Drive Index or the Spindle Index is coupled from the disk drive 334 to the drive motor control board 338.

Figure 5:
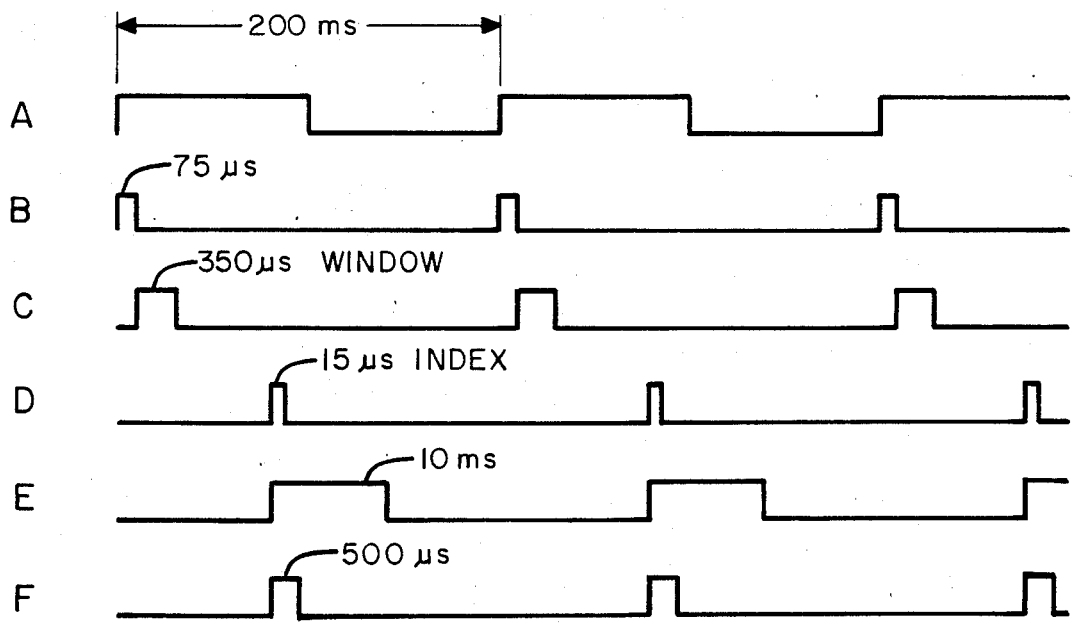
FIGS. 5 A–F are waveform diagrams helpful in explaining the operation of the embodiment of FIG. 4.

Before describing the details of construction and operation of the control board, it is deemed helpful to consider the waveform diagram of FIG. 5. Waveform A represents the Sync Index pulses produced by the Sync Index generator 342 of the FDKM 330 and which is transmitted, via the Way bus to the drive motor control board 338. It can be seen that waveform A is a 50 percent duty cycle square wave which is derived from the 60 Hz power line voltage and, as such, has a period of 200 ms for a 5 Hz, 5¼-inch drive and a period of about 167 ms for a 6 Hz, 8-inch drive.

Waveform C represents sync window pulses generated on the control board 338. In the preferred embodiment, they are derived from the trailing edges of the pulses of waveform B. The pulses of waveform B are, in turn, derived from the leading edges of the pulses of waveform A and may, for example, have widths on the order of 76 microseconds.

In the illustrated embodiment, the window pulse C is depicted as having a nominal value of 350 microseconds. This value of the window pulse is more or less arbitrary from the standpoint that it represents the degree or extent of the disk synchronization desired. As each window pulse C is fixed relative to an external reference, i.e., the Sync Index of waveform A, which occurs at some predetermined point in the period of the AC line voltage, each slave diskette, when in sync relative to that window, is thereby also indexed relative to the external reference. As a result, all of the slave drives are also autonomously synchronized one with the other when their respective Disk Index pulses are brought within the window.

Figure 6:
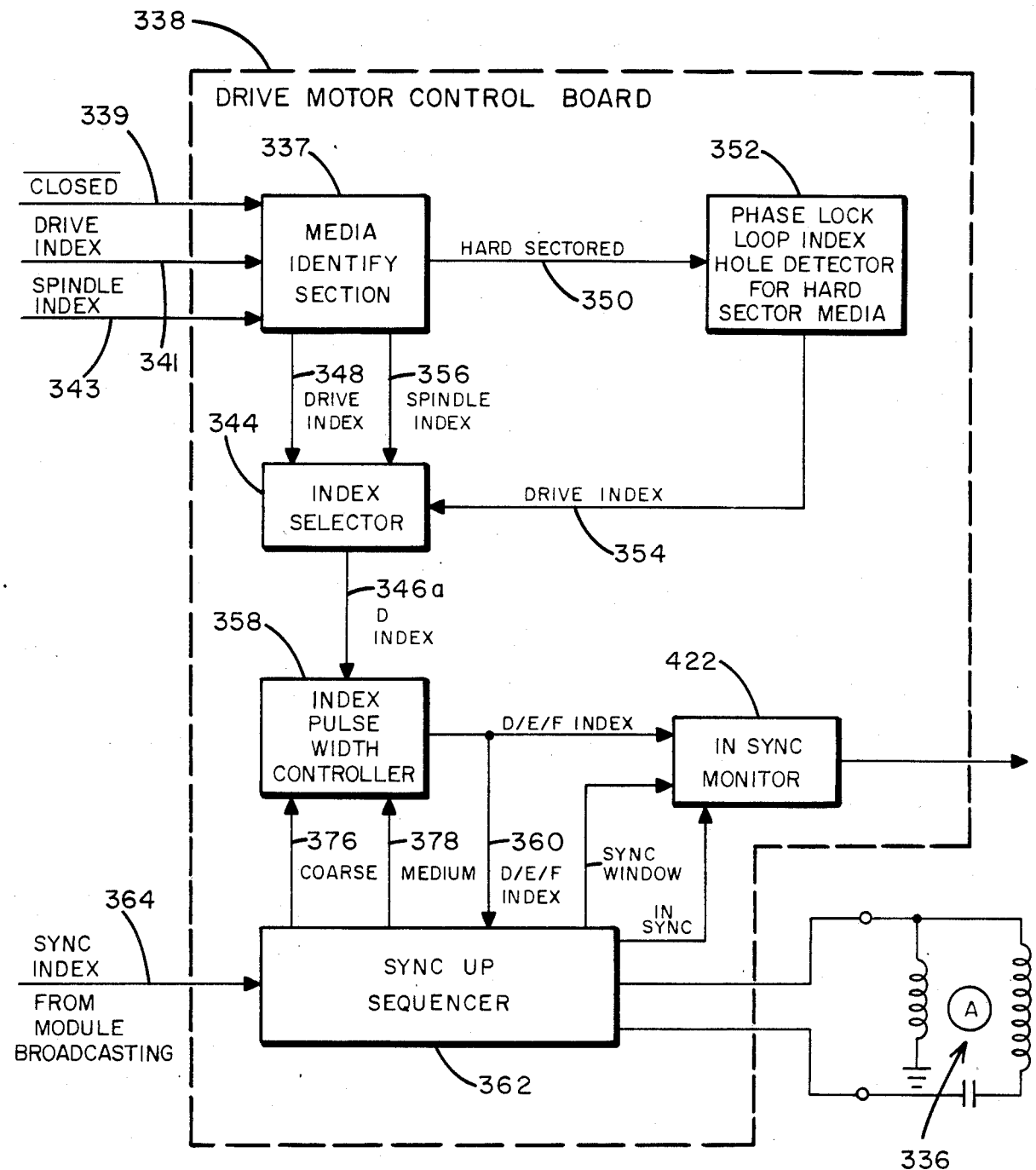
FIG. 6 is a more detailed block diagram of a synchronizing apparatus used in the system of FIG. 4.

Referring now to FIG. 6, there is represented by means of a general block diagram the basic organization of the drive motor control board 338. Included is a media identification section 337 which receives as its inputs a $\overline{\text{door closed}}$ signal on line 339, a Drive Index on line 341 and a Spindle Index pulse on line 343. The Drive Index pulse of waveform D (FIG. 5) represents either the index hole of a soft or hard sectored disk or a spindle marking in the case of a disk which has no index hole. One or the other of a Drive Index pulse, a Spindle Index pulse or a Derived Drive Index pulse passes through the index selector 344 and the output appearing on line 346(a) may be considered as the Drive Index (waveform D) as far as further processing operations are concerned.

The media identify section 337 includes a sequencer capable of sorting out the pulses produced by index holes of soft sectored disks, causing them to be applied via line 348 to the index selector 344. The pulses produced by index and sector holes of hard sectored disks are applied over line 350 to a phase lock loop index hole detector 352 which functions to sort out pulses produced by the diskette index holes from those produced by the diskette sector holes with the Drive Index pulses being applied via line 354 to the index selector 344. If there are no pulses on the input line 341 to drive the sequencer in the media identify secion 337, and thus no output pulses for either of the lines 348 or 354, the Spindle Index pulse on line 343 will be fed directly via line 356 to the index selector 344.

Irrespective of the type of disk involved, only one of the lines entering the index selector 344 will be active at any given time. Index selector 344 acts as OR gate in feeding drive index pulses via line 346(a) to an index pulse width controller circuit 358.

The synchronization process involves aligning the Drive Index pulse (waveform D) with the sync window pulse (waveform C). When a diskette first begins to spin following door closure, the window and index pulses C and D are normally not in phase with each other, but the relative positions of those pulses are maintained because both the drive motor and the sync window (waveform C) are synchronous with the applied AC power. The underlying basis for the synchronization system of he alternative embodiment involves the periodic shutting off of the applied AC power to the drive motor and allowing the motor to coast such that the Drive Index pulse (waveform D) drifts incrementally closer to the sync window (waveform C).

The position adjustment is performed in three steps. First, the power to the motor 338 is turned off for 1½ cycles of the 60 Hz line voltage, once for each revolution of the diskette until the Drive Index pulse D is within a first coarse time interval relative to the sync window C. Next, the power to one winding of the motor is turned off for 1½ cycles of the 60 Hz line voltage, once for each revolution of the diskette, until the Drive Index pulse D is within a second, substantially shorter time interval of the window C. Finally, the power to one motor winding is turned off for one-half cycle of the 60 Hz line, once for each revolution of the diskette, until the Disk Index pulse D falls within the Sync Index window C. During these three steps, the Sync Index window C is delayed slightly relative to the rising edge of the Sync Index (waveform A). When the Drive Index pulse D falls within the window C during the third step, synchronization is complete and the Drive Index pulse is approximately centered in the sync window.

With continued reference to FIG. 6, the means for affecting the position adjustment via the aforementioed three steps will be explained. The Drive Index pulse width controller 358 functions to generate the waveforms E and F of FIG. 5 for the course and medium modes. It directly passes the Drive Index pulse (waveform D) for the fine adjustment mode. The waveform E, F and D appear consequently on the output line 360.

Figure 7:
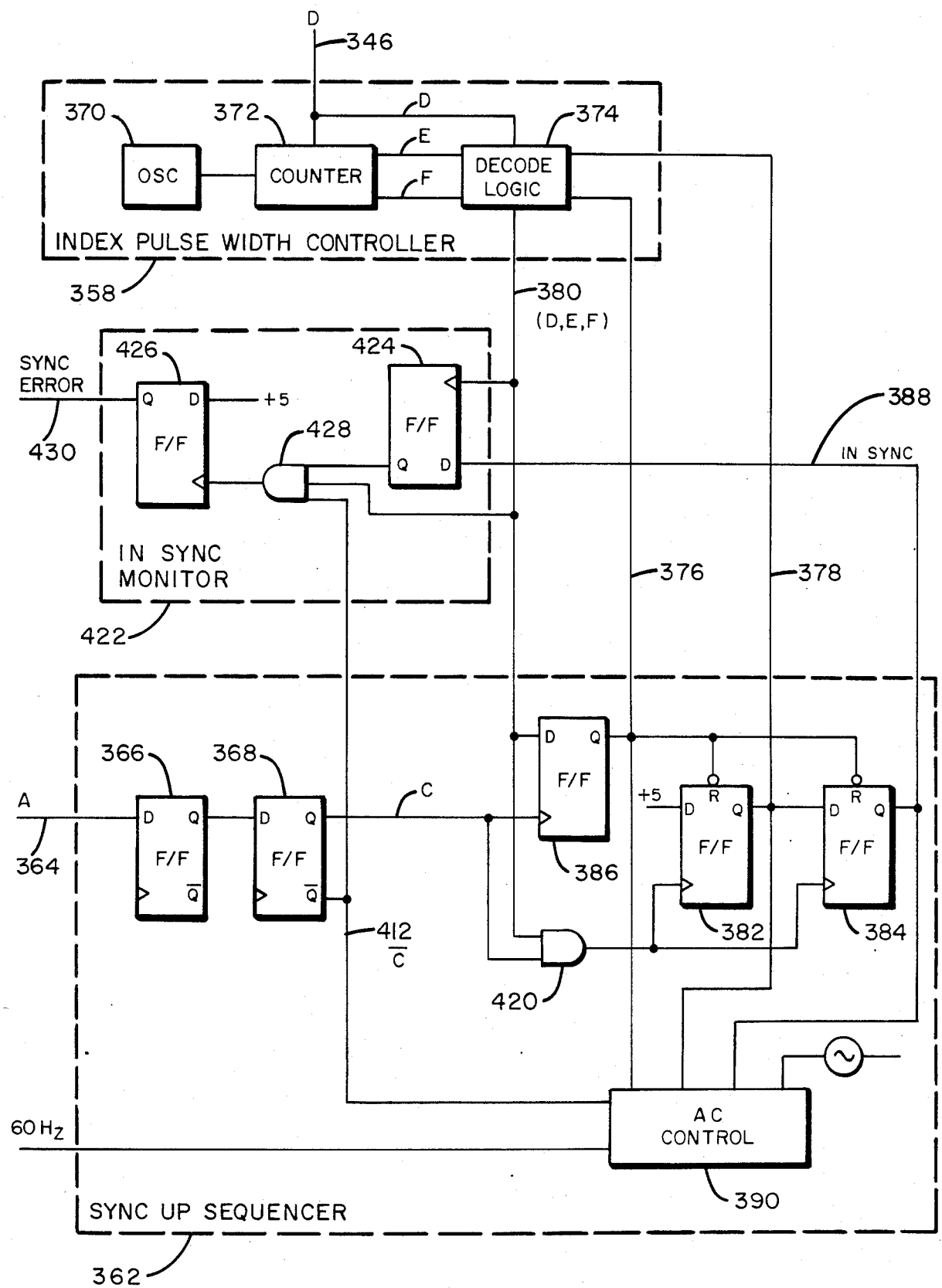
FIG. 7 is a somewhat more detailed block diagram showing the circuit implementation of various blocks illustrated in the diagram of FIG. 6.
Figure 8:
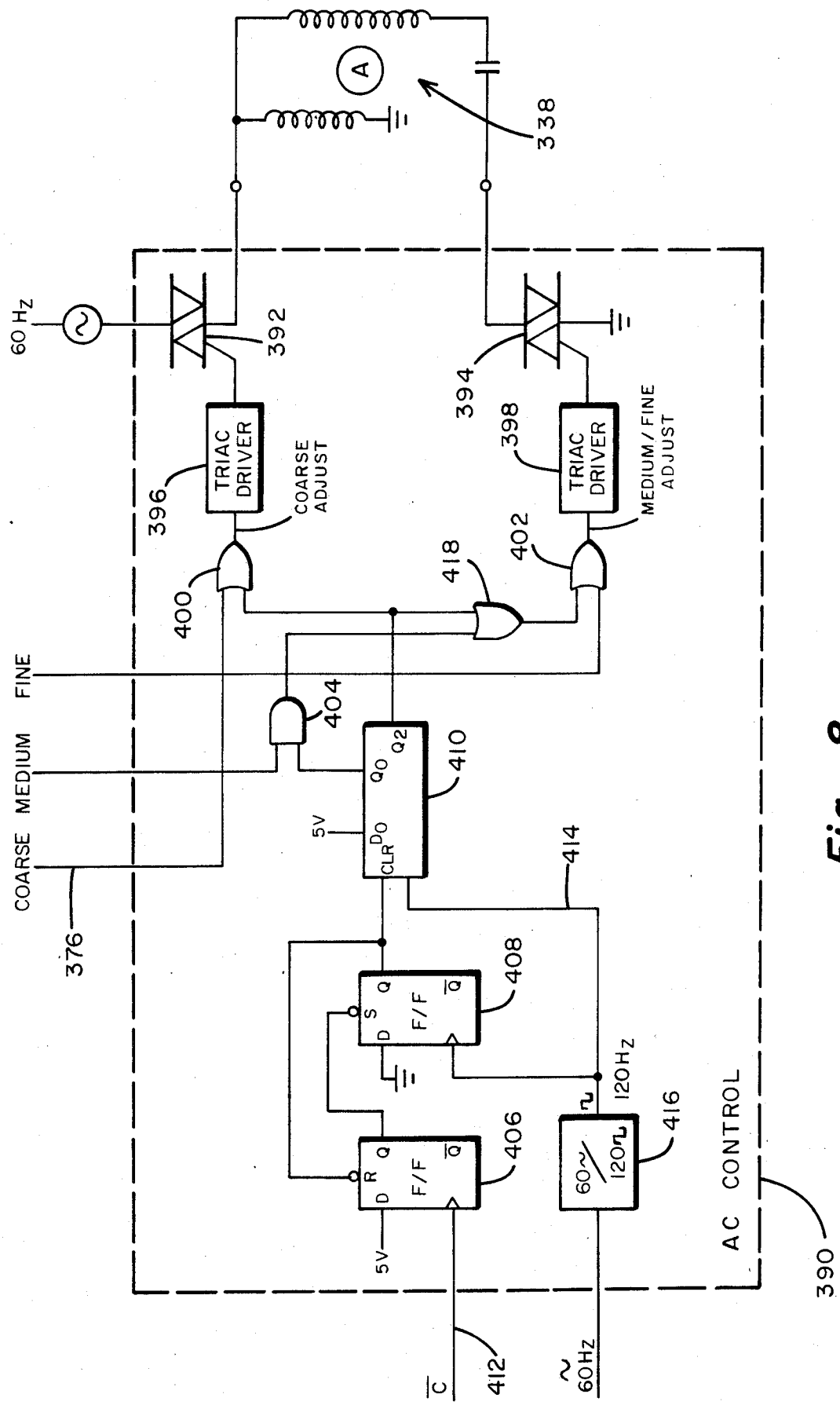
FIG. 8 is a logic diagram showing an implementation of the AC control shown in FIG. 6.

Upon initiating the sync-up process, the position of the index hole of a diskette, or the spindle in the case of a diskette which has no index hole, will occur at a random time relative to the occurrence of the Sync Index signal from the FDKM. Referring to FIGS. 6 and 7, the Sync Index pulse (waveform A) arrives via a control line 364 in the Way at the sync-up sequencer 362. Included in the sequencer 362 and triggered by pulses arriving on the line 364 are first and second one-shot circuits 366 and 368 which operate to successively generate first the pulse of waveform B which may occur approximately 75 microseconds following the rising edge of the Sync Index and, secondly, a 350 microsecond sync window pulse (waveform C) which follows the trailing edge of the pulses of waveform B. Those skilled in the art will recognize that the indicated times are exemplary only and that alternative values can be selected. Thus, the delay pulse B serves to offset the sync window pulse C from the sync Index pulse A by 75 microseconds. This prevents a premature false sync signal. That is, the 75 microsecond delay insures that when the syncup finally occurs, it will be subsequent to the occurrence of the leading edge of the Sync Index pulse in that it is necessary that the leading edge of the Drive Index pulse not occur before the leading edge of the Sync Index pulse.

With reference to FIG. 6, it is seen that the index pulse width controller 358 includes a source of regularly occurring clock signals 370 which are fed to a binary counter 372, the outputs of the counter being coupled to a decoding logic network 374. The sync-up sequencer 362 is coupled to the decode logic 374 by way of control lines 376 and 378. The index pulse width controller 358 functions in three distinct modes. In the first, the Drive Index pulse of waveform D on the input line 346 is sequentially converted during the sync-up process to coarse and medium width pulses (waveforms E and F) of 10 ms and 500 microseconds (½ millisecond), respectively. In the third mode, a fine width pulse is obtained which may optionally have the same pulse width as that of the Drive Index pulse of waveform D by simply using that Drive Index pulse as the final adjustment in the sync-up process in the same form as it is received from the index selector 344. Each time the Drive Index pulse D from the selector 344 is applied to the pulse width controller 358, it clears and restarts the counter 372. This counter outputs the pulses of waveforms E and F which, as will be described below, exit the controller 358 over line 380 to the sync-up sequencer 362. The logic decoding means 374 associated with the binary counter is connected to and controlled by course and medium mode flip-flops 382 and 384.

In operation, the system initially defaults to the coarse mode upon the closing of the disk drive door. While in the coarse mode, the counter 372 counts to a value of 256 in each cycle initiated by the Drive Index pulse D, i.e., approximately every 10 milliseconds. During that time, the coarse index pulse E is fed through the decoding means 374 on line 380 to the sync-up sequencer 362. Circuitry within the sequencer 362, namely, the flip-flop 386, performs a comparison between the coarse pulse E and the Sync Index window C to detect whether an overlap exists and, if so, a shift is made from the coarse mode to the medium mode.

The outputs Q of the course, medium and fine flip-flops 386, 382 and 384 are applied by way of the lines 376, 378 and 388 to the AC control section 390 which controls the "off" periods for the drive motor 336. The AC control section 390 which is shown in greater detail in FIG. 7 contains two semi-conductor switching devices, such as Triacs 392 and 394 as well as their associated drive circuits 396 and 398. The Triacs 392 and 394 are connected in a series circuit arrangement with an 60 Hz AC supply and two field windings of the AC synchronous hysteresis motor 336. The Triac drivers are, in turn, controlled through logic means including OR circuits 400 and 402 and AND gate 404.

During the coarse mode, Triac 392 is turned off for about 25 milliseconds during each disk revolution. The turning off of the Triacs 392 and 394 in each of the three modes referred to above is controlled by the two D-type flip-flops 406 and 408 and a shift register 410. The one-shot 368 (FIG. 6) generates the sync window waveform C, and the inverse thereof $\overline{C}$ is applied via line 412 to the clock input of flip-flop 406. This flip-flop, in effect, functions to clear the shift register 410 at the start of each new sync window pulse C. The shift register 410 is clocked by 120 Hz pulses on line 414, which is generated by frequency multiplier circuit 416. This latter circuit functions to convert the 60 Hz sine waves to a 120 Hz pulse train.

When the system is in its coarse mode, the output Q of flip-flop 386 is low, and thus line 376 leading to OR gate 140 is low. As such, the driver 396 is controlled by the output of stage $Q_2$ of the shift register 410. That register is clocked by the 120 Hz pulses on line 414, and the Q output will go high after three such clock pulses which corresponds to a 25 millisecond time interval. Thus, the output from OR circuit 400 will go high 25 milliseconds after the start of the window pulse C. Likewise, the output of OR gate 402 will go high at the same time in that it is connected to $Q_2$ output of the shift register 410 via OR gate 418. The subseuqent triggering of the Triacs 392 and 394 will apply power to both field windings of the motor 338 until the start of the next sync window pulse (waveform C) at which time the shift register 410 is reset by way of flip-flop 406, all as has already been explained. It can be seen, then, that in the coarse mode, the Triac 392 is turned off for 25 milliseconds and this interrupts the power to the motor for a corresponding period during each disk revolution which, typically, is 200 milliseconds for a 5¼-inch disk or 166 milliseconds for an 8-inch disk. The periodic power interruption causes corresponding intermittent coasting of the motor and a resulting drift of the drive index pulse, D. This interruption cycle is repeated until there is an overlapping of the coarse pulse of waveform E with the sync window of waveform C. When this overlapped condition pertains, the Q output of flip-flop 386 goes high causing a shift to the "medium" mode.

As was explained, the coarse mode is controlled by the coarse flip-flop 386 in the sequencer 362. This flip-flop is clocked by the window pulse C periodically appearing at the output of the one-shot circuit 368, and the coarse pulse E on line 380 is directed to the D-input thereof. The output signal on line 376 of the coarse flip-flop is maintained low until such time that the flip-flop 386 is clocked by the window pulse C during a time when the coarse pulse E is on the data input of the flip-flop 386. This event indicates that the motor is then within 10 milliseconds of the sync window C and calls for a shift to the medium mode.

The low-to-high change on line 376, which stays high thereafter, has the effect of first enabling flip-flop 382 and also changing the decode logic 374 to form the ½ millisecond medium pulse F by changing the latched count of counter 372 to 13 counts and then turning Triac 392 on permanently through OR gate 400 and the Triac driver 396. During the medium mode, only the Triac driver 398 is initially turned off for 25 milliseconds during each disk revolution and this interrupts the power to only one of the field windings of the motor for that period of time during each disk revolution. The operation relative to the shift register 410 is substantially the same for the medium mode as it was for the coarse mode, the only difference being that Triac 392 is permanently on by reason of the enable on line 376. Thus, when output $Q_2$ of the shift register 410 is initially low at the start of the sync window pulse, C, it is only Triac 394 that is off.

The periodic interruption of power to the motor windings causes corresponding intermittent coasting of the motor and a resulting drift of the pulse F. This interruption cycle is repeated until there is an overlapping of the medium pulse of waveform F with the sync window of waveform C which then precipitates the fine mode.

In the medium and fine modes, the flip-flops 382 and 384 are clocked through an AND gate 420. Referring to the operation of the medium flip-flop, the AND gate 420 through which it is clocked has inputs which are the window C and the medium pulse F on line 380. The D-input of flip-flop 382 is tied to a point of fixed potential and, as such, the output signal therefrom appearing on line 378 controlling the fine/medium counting cycle of the counter 372 is held until such time that this flip-flop is clocked by the output from AND gate 420, which occurs when the sync window pulse C and the medium pulse F are coincident and satisfy the AND condition of the gate 420. The high output on line 378 indicates that the motor is within ½ millisecond of the sync window, whereupon a shift is made to the fine mode. This shift to the fine mode places a high signal on the D-input of the flip-flop 384 and the transition signal appearing on line 378 switches the decode logic 374 to permit the 15 microsecond drive index pulse D on line 346 to pass directly to the line 380.

While in the fine mode, Triac 392 remains continuously on and Triac 394 is turned off for approximately eight milliseconds during each disk revolution. The shift register 410 is clocked by the 120 Hz outputs from frequency multiplier 416 and the $Q_0$ output will go high after one clock period which equals eight milliseconds. This enables AND gate 404, allowing Triac 394 to turn on after only eight milliseconds rather than 25 milliseconds as was the case in the medium mode. Both field windings of the AC hysteresis motor will be coupled to the AC power until the start of the next sync window pulse when the shift register 410 is again reset via flip-flop 406, all as was previously described.

The periodic power interruption causes corresponding intermittent coasting of the motor and a resulting drift of the drive index pulse relative to the sync window. The interruption cycle is repeated until there is an overlapping of the two. The fine mode flip-flop 384 is clocked by the output from AND gate 420 and its output on line 388 is applied as an input to the Triac driver 398 via OR gate 402. Both Triacs 392 and 394 remain permanently on once synchronization has been achieved and this synchronous condition pertains until the system is turned off or the door to the drive is opened.

With reference again to FIG. 6, once synchronization has been achieved, the monitoring of that condition is performed by the in-sync monitor 422, which continually operates to detect an out-of-sync condition. The monitor is comprised of two D-type flip-flops 422 and 426 along with a three-input AND gate 428. The output of the fine mode flip-flop 384 is connected to the D-input of the flip-flop 422 which, in turn, is clocked by the drive index pulse, D, with the output of the flip-flop 424 comprising the D pulse when the in sync line 388 is high. The inputs for the AND gate 428 are the output of the flip-flop 424, the Drive Index pulse on line 380 and the inverted sync window $\overline{C}$. AND gate 428 clocks the flip-flop 426 whose D input is connected to a point of fixed potential. As long as the drive index pulse, D, remains in the window, C, i.e., the in-sync condition, gate 428 will remain low in that pulses D and $\overline{C}$ will not be simultaneously high. If an out-of-sync condition should occur, the output from AND gate 428 will go high and clock flip-flop 426. This creates the sync error signal on line 430 which remains high and which may be used to turn on an error indicator and, when polled by the FDKM, indicates to the FDKM (master) that a data broadcast should be inhibited until synchronization of all slaves again occurs.

The invention has been described herein in considerable detail in order to comply with the Patent Statutes and to provide those skilled in the art with the information needed to apply the novel principles, and to construct and use such specialized components as are required. Hence, it is to be understood that the invention can be carried out by specifically different equipment and devices, and that various modifications, both as to equipment details and operating procedures, can be accomplished without departing from the scope of the invention itself.

What is claimed is:

1. A system for the mass replication of information stored on a magnetic recording medium comprising:
   (1) a master station including means at said master station for generating sync pulses and means for storing the information to be replicated;
   (b) a plurality of slave stations, each slave station including:

(i) drive means for moving a magnetic recording disk relative to a magnetic read/record head, said drive means or recording disk having a sensible indicia thereon;

(ii) speed control means coupled to said drive means for adjusting the speed of said recording disk relative to said read/record head;

(iii) sensor means associated with said drive means or recording disk for producing an index pulse each time said indicia passes said sensor;

(c) bus means coupling said master station to each of said plurality of slave stations for transmitting said sync pulses and signals representative of the stored information to be replicated to said plurality of slave stations;

(d) synchronization circuit means including (i) comparing means operatively coupled to receive said index pulses and said sync pulses for producing an output signal representative of the temporal spacing therebetween;

(ii) decoding means connected to the output of said comparing means for producing timing pulses at a rate proportional to said output signal of said comparing means;

(iii) bi-directional counting means coupled to said decoding means for tallying the timing pulses produced by said decoding means; and (iv) digital-to-analog conversion means coupled to periodically convert the binary count in said bi-directional counting means to an analog signal, said analog signal being applied to said speed control means for adjusting the speed of said recording disk until said index pulses are in substantial time coincidence with said sync pulses; and (e) sync status report means in said slave stations coupled to said bus means for signaling to said master station when the substantial time coincidence condition is obtained.

2. The system as in claim 1 and further including means in said master station enabled by signals emanating from said sync status report means for enabling the transmission of signals representative of said information to be replicated from said master station simultaneously to each of said plurality of slave stations once all of said drive means are in rotational synchronism.

3. The system as in claim 1 wherein said index pulses are in substantial time coincidence with said sync pulses when the two occur within a predetermined time window.

4. The apparatus as in claim 1 and further including counter control means coupled to said bi-directional counting means for controlling count direction in accordance with the relative timing of said drive index within a predetermined time window.

5. Apparatus as in claim 1 wherein said speed control means comprises switching means for controlling the power applied to said drive means.

6. Apparatus as in claim 5 wherein said synchronization circuit means comprises:

(a) means coupled to receive said sync index for defining a sync window time interval; and (b) means coupled to said switching means for periodically interrupting the power applied to said drive means for time periods sufficient to cause said drive index to become coincident with said sync window.

* * * * *